United States Patent
Edpalm et al.

(10) Patent No.: US 12,056,926 B2
(45) Date of Patent: Aug. 6, 2024

(54) METHOD AND IMAGE-PROCESSING DEVICE FOR VIDEO PROCESSING

(71) Applicant: Axis AB, Lund (SE)

(72) Inventors: Viktor Edpalm, Lund (SE); Song Yuan, Lund (SE); Raphael Teller, Lund (SE)

(73) Assignee: AXIS AB, Lund (SE)

( * ) Notice: Subject to any disclaimer, the term of this patent is extended or adjusted under 35 U.S.C. 154(b) by 430 days.

(21) Appl. No.: 17/498,764

(22) Filed: Oct. 12, 2021

(65) Prior Publication Data
US 2022/0138468 A1 May 5, 2022

(30) Foreign Application Priority Data
Nov. 5, 2020 (EP) ..................................... 20205936

(51) Int. Cl.
| | |
|---|---|
| G06V 20/40 | (2022.01) |
| G06V 20/52 | (2022.01) |
| H04N 19/105 | (2014.01) |
| H04N 19/172 | (2014.01) |
| H04N 19/46 | (2014.01) |
| H04N 19/85 | (2014.01) |

(52) U.S. Cl.
CPC .............. *G06V 20/40* (2022.01); *G06V 20/52* (2022.01); *H04N 19/105* (2014.11); *H04N 19/172* (2014.11); *H04N 19/46* (2014.11); *H04N 19/85* (2014.11)

(58) Field of Classification Search
None
See application file for complete search history.

(56) References Cited

U.S. PATENT DOCUMENTS

| | | | |
|---|---|---|---|
| 2004/0075738 A1 | 4/2004 | Bruke et al. | |
| 2007/0297518 A1* | 12/2007 | Han | H04N 19/196 |
| | | | 375/E7.199 |
| 2019/0200014 A1* | 6/2019 | Toresson | H04N 19/82 |
| 2020/0202689 A1 | 6/2020 | Yuan et al. | |
| 2021/0390983 A1* | 12/2021 | Yau | H04N 5/2621 |

FOREIGN PATENT DOCUMENTS

| | | | | | |
|---|---|---|---|---|---|
| CN | 105280205 | A | * | 1/2016 | |
| CN | 109951709 | A | * | 6/2019 | ........... H04N 19/117 |
| CN | 110677672 | A | | 1/2020 | |
| CN | 110832856 | A | | 2/2020 | |
| EP | 3503555 | A1 | | 6/2019 | |
| JP | 2005223617 | A | * | 8/2005 | |

OTHER PUBLICATIONS

Office Action issued Nov. 24, 2023 in Chinese Patent Application No. 202111298007.2 with computer-generated English translation thereof.

* cited by examiner

*Primary Examiner* — Jiangeng Sun
(74) *Attorney, Agent, or Firm* — XSENSUS LLP

(57) ABSTRACT

A method for controlling video processing. A stream of images emanating from an image sensor is received. The contents of an image in the stream is evaluated. A part of the image stream, which part is antecedent the image being evaluated, is forwarded to a video encoder. Until the evaluation is complete, one or more empty frames are added at the end of an encoded image stream corresponding to the forwarded image stream.

19 Claims, 9 Drawing Sheets

METHOD AND IMAGE-PROCESSING DEVICE FOR VIDEO PROCESSING

CROSS-REFERENCE TO RELATED APPLICATION

This application claims priority to European Patent Application No. 20205936.6, filed on Nov. 5, 2020, the disclosure of which is incorporated herein by reference in its entirety.

TECHNICAL FIELD

The embodiments herein relate to image-processing. In particular, a method and image-processing device for video processing are disclosed. A corresponding computer program and a computer program carrier are also disclosed.

BACKGROUND

Surveillance of the public using imaging, in particular video imaging, is common in many areas around the world. Areas that may need monitoring are for example banks, stores, and other areas where security is needed, such as schools and government facilities. Other areas that may need monitoring are processing, manufacturing and logistics applications where video surveillance is primarily used to monitor processes.

However, there may be requirements to not be able to identify persons from the video surveillance.

Several image-processing techniques have been described to avoid identifying persons while still being able to recognize activities. For example, edge detection/representation, edge enhancement, silhouetting objects, and different sorts of "colour blurring", such as colour variation or dilation are such examples of manipulations.

Image-processing refers to any processing that is applied to an image. The processing can include application of various effects, masks, filters or the like, to the image. In this manner, the image can e.g. be sharpened, converted to grey scale, or altered in some way. The image has typically been captured by a video camera, a still image camera or the like.

As mentioned above one way of avoiding to identify persons is by masking moving people and objects in real time. Masking in live and recorded video can be done by comparing a live camera view with a set background scene and applying dynamic masking to areas of change—essentially moving people and objects. Color masking, which may also be referred to solid color masking or monochrome masking where an object is masked by an overlaid solid mask of a certain color, provides privacy protection while enabling you to see movements. Mosaic masking, also referred to as pixelation, pixelated privacy masking or transparent pixelated masking shows moving objects in lower resolution and allows you to better distinguish forms by seeing an object's colors.

FIG. 1 illustrates an exemplifying digital camera 100. The digital camera 100 produces two image streams A and B resulting in a first digital image 101A with privacy masking, and a second digital image 101B without privacy masking. In the first digital image 100A the identities of individuals are masked, for example by comparing a live camera view with a set background scene and applying dynamic masking to areas of change.

Masking live and recorded video is suitable for remote video monitoring or recording in areas where surveillance is otherwise problematic due to privacy rules and regulations. It's ideal for processing, manufacturing and logistics applications when video surveillance is primarily used to monitor processes. Other potential applications are in retail, education and at government facilities.

Although masking provides many advantages one problem that arises is that an effective frame rate may be lowered due to applying the mask to moving objects, such as humans, since the masking algorithm takes a non-negligible time to finish. This is not good if other components of a video network system operates with a higher frame rate, e.g. a full frame rate, i.e. the desired frame rate set for the particular stream by a user.

Another problem that arises is an increase in the power consumption of the video camera, due to increased processing of the images, in particular due to processing related to synchronization of the mask with video images.

Further, when the information relating to the captured images are to be sent over a network, the masking may result in an increased required bandwidth due to an increase in information related to the captured images.

SUMMARY

In order to better understand the advantages of embodiments herein an alternative reference solution will first be described. When performing privacy masking synchronization between an image frame and a mask is very important. The expressions image frame, video frame and just frame will be used interchangeably below. Masking of people and objects may be done by defining pixels associated with the people or objects as "foreground pixels" in relation to a determined background scene, and to mask the foreground pixels as they move around on the background. The masking may for example be performed by flood-filling the contour of an individual or object. Alignment between mask and individual is critical in order to not reveal any parts of the individual or object.

One way of synchronizing mask and video is to pause video frames until analysis related to the masking of the video frame has finished. For example, a video frame may be paused until an analysis related to a moving object recognition has finished. Pausing the video frame may mean that no new frames passes a function that synchronizes the video frame with a mask, meaning that a last synchronized frame is sent again and again to an encoder. Once the mask analysis of the video frame has finished it may be regarded as a synchronized frame.

If a video frame is needed at the encoder before the analysis has finished (e.g. to obtain a certain required video frame rate of for example 30 fps [frames per second]), a copy of the most recent previously successfully synchronized videoframe may be sent on to the encoder. However, this creates an undesirable extra system load which increases the power consumption, since the same frames are processed again. Further, when the video is sent over a network the added frames also requires extra network resources as there is more data to be sent on the network.

Alternatively, the frame can be dropped, resulting in a video frame drop. Such a frame drop may give the impression that the camera or video stream is broken, particularly when the camera or objects in the scene are moving. E.g. synchronisation of video frames with a mask in combination with a frame drop may produce the following video frame pattern at the user: (frame 0) move to the left, (frame 1) move to the left, (frame 2) stop, (frame 3) moved twice the step to the left, (frame 4) moved to the left. The stop at frame 2 may be perceived by the user as the camera or video stream is broken. Further, many video network system components prefer receiving frames at regular intervals.

An object of embodiments herein may thus be to obviate some of the problems mentioned above, or at least reduce the impact of them. Specifically, an object may be to reduce the power consumption of an image-processing device, such as a video camera, during privacy masking. More specifically, an object may be to reduce the power consumption of the image-processing device while keeping a constant frame rate. A further object may be to reduce the bandwidth needed to send a video, or stream of images, on which privacy masking has been applied over a network.

According to an aspect, the object is achieved by a method for controlling video processing. The method may be performed by an image-processing device. A stream of images emanating from an image sensor is received. The contents of an image in the stream is evaluated. A part of the image stream, which part is antecedent the image being evaluated, is forwarded to a video encoder. Until the evaluation is complete, at least a first empty frame is added at the end of an encoded image stream corresponding to the forwarded image stream.

According to another aspect, the object is achieved by an image-processing device configured to perform the above method.

According to further aspects, the object is achieved by a computer program and a computer program carrier corresponding to the aspects above.

By adding the at least first empty frame at the end of the encoded image stream the image-processing device saves power since the added empty frames requires less, or in some cases no further image processing.

A further advantage of embodiments herein is that the bandwidth required for transmitting the stream of images is reduced compared to other methods of transmitting privacy-masked video. This is so because the amount of data needed to represent the empty frame is considerably less than the amount of data needed to represent a frame originating from the sensor, and even less than a copy of such a frame.

Yet another advantage of embodiments herein is that the image-processing device may maintain a certain desired frame rate, which is beneficial for internal processes as well as for a receiver of the generated video stream.

BRIEF DESCRIPTION OF THE DRAWINGS

In the figures, features that appear in some embodiments are indicated by dashed lines.

The various aspects of embodiments disclosed herein, including particular features and advantages thereof, will be readily understood from the following detailed description and the accompanying drawings, in which.

DETAILED DESCRIPTION

As mentioned above it may be of interest to perform privacy masking on a video in a way that for example allows people counting or queue monitoring on anonymous image data.

As further mentioned above, an object of embodiments herein may be to reduce the power consumption of an image-processing device, such as a video camera, during privacy masking. A further object may be to reduce the bandwidth needed to send a video, or stream of images, on which privacy masking has been applied, over a network.

As will be further explained below, embodiments herein allow performing privacy masking on a video with a reduced power consumption and with a reduced required bandwidth, while maintaining a certain desired frame rate.

Figure 1:
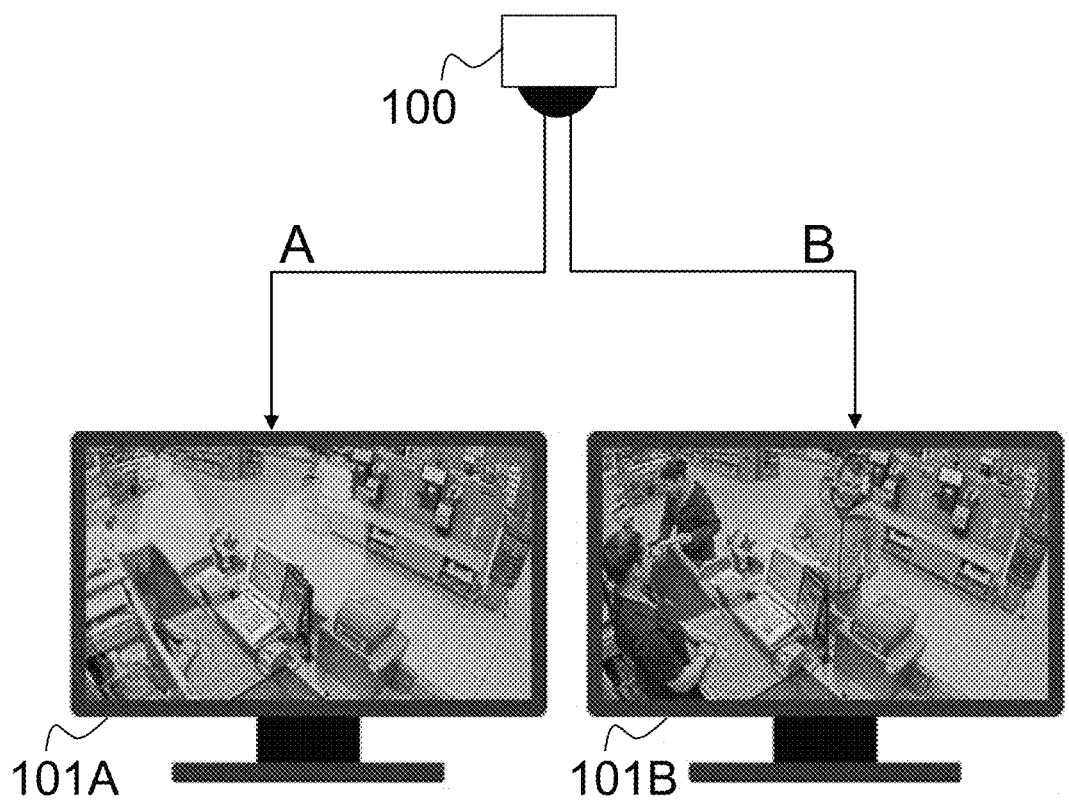
FIG. 1 illustrates a digital image with privacy masking and a digital image without privacy masking.
Figure 2A:
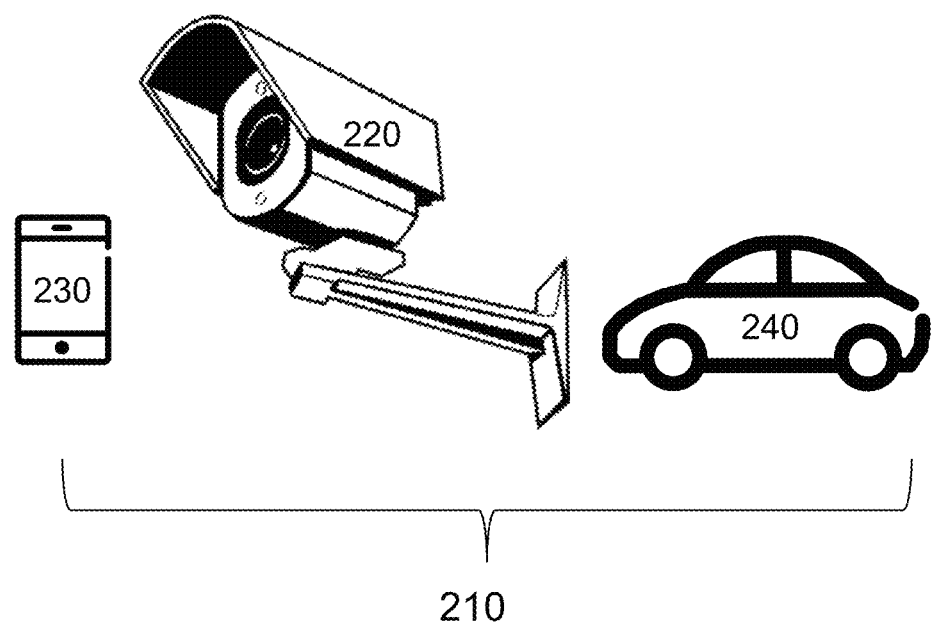
FIG. 2a illustrates exemplifying embodiments of image-capturing devices herein.

Embodiments herein may be implemented in one or more image-processing devices. FIG. 2a depicts various exemplifying image-processing devices 210, which can perform image processing on a digital image, such as a digital video image. The image-processing device may be an image-capturing device 220, 230, 240, such as a video recorder, a surveillance camera 220, a digital camera, a smartphone 230 including an image sensor, or a car 240 including an image sensor.

Figure 2B:
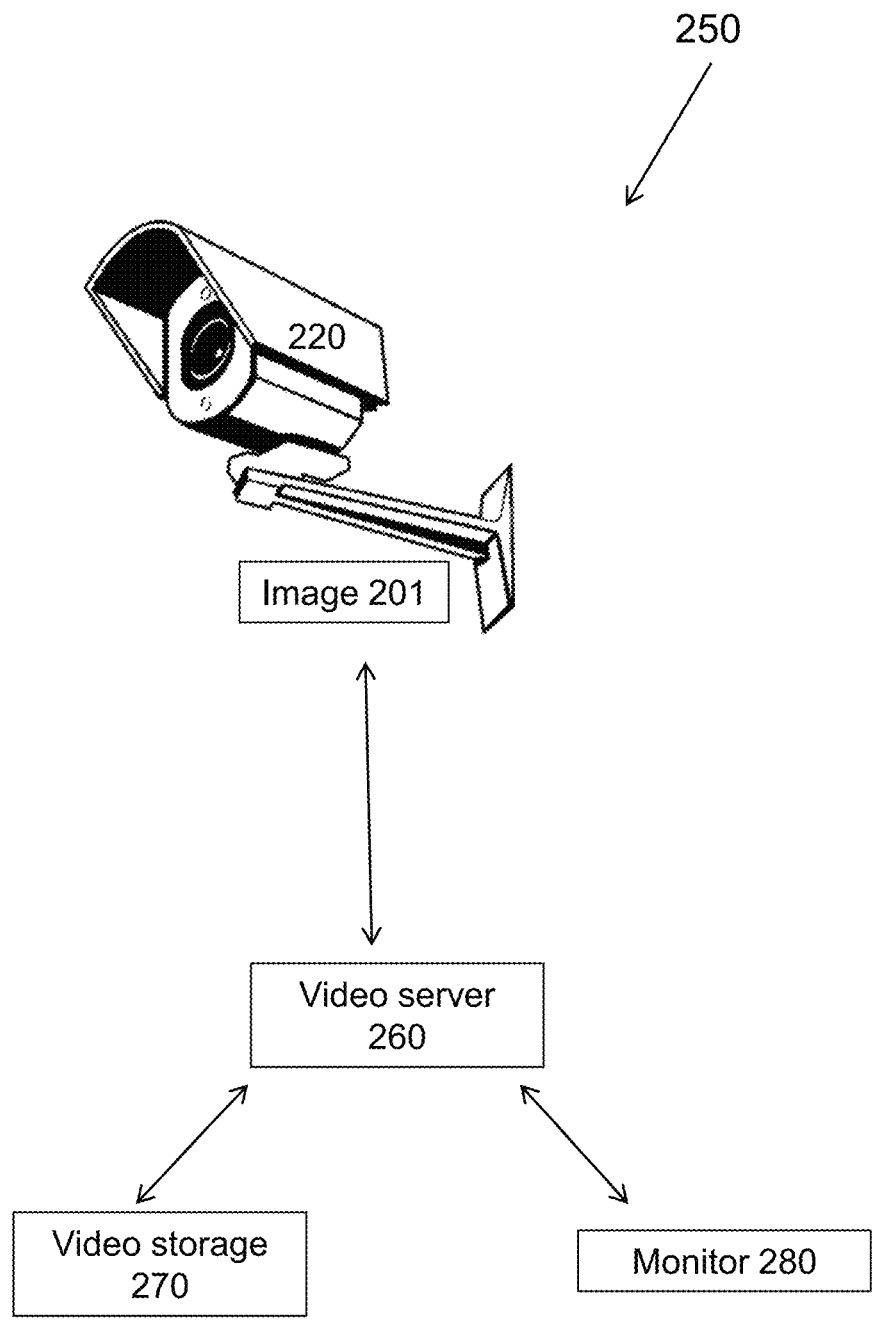
FIG. 2b is a schematic overview illustrating exemplifying embodiments herein.

FIG. 2b depicts an exemplifying video network system 250 including the surveillance camera 220 which can perform image processing on a digital image 201, such as a digital video image. The video network system 250 may also be referred to as the network 250 herein. The image-processing device 210, e.g. a wired or wireless device, may also obtain the image, for example from the image-capturing device 220, 230, 240 over the video network system 250 or the like. This may for example be the case for a video server 260 in FIG. 2b.

A video server is a computer-based device that is dedicated to delivering video. Video servers are used in a number of applications, and often have additional functions and capabilities that address the needs of particular applications. For example, video servers used in security, surveillance and inspection applications typically are designed to capture video from one or more cameras and deliver the video via a computer network. In video production and broadcast applications, a video server may have the ability to record and play recorded video, and to deliver many video streams simultaneously. In FIG. 2b, the video server 260 is connected over the network 250, to the image-capturing device exemplified by the surveillance camera 220. The video server 260 may further be connected to a video storage 270 for storage of video images, and/or connected to a monitor 280 for display of video images.

Thus, the image-processing device 210 is capable of processing the digital image. The image may have been captured by the image-processing device itself or it may have been received from another device, which captured the image, or from a memory, such as hard drive or the like.

Embodiments herein may be implemented in an imaging system. In order to better understand embodiments herein such an imaging system will first be described.

Figure 3A:
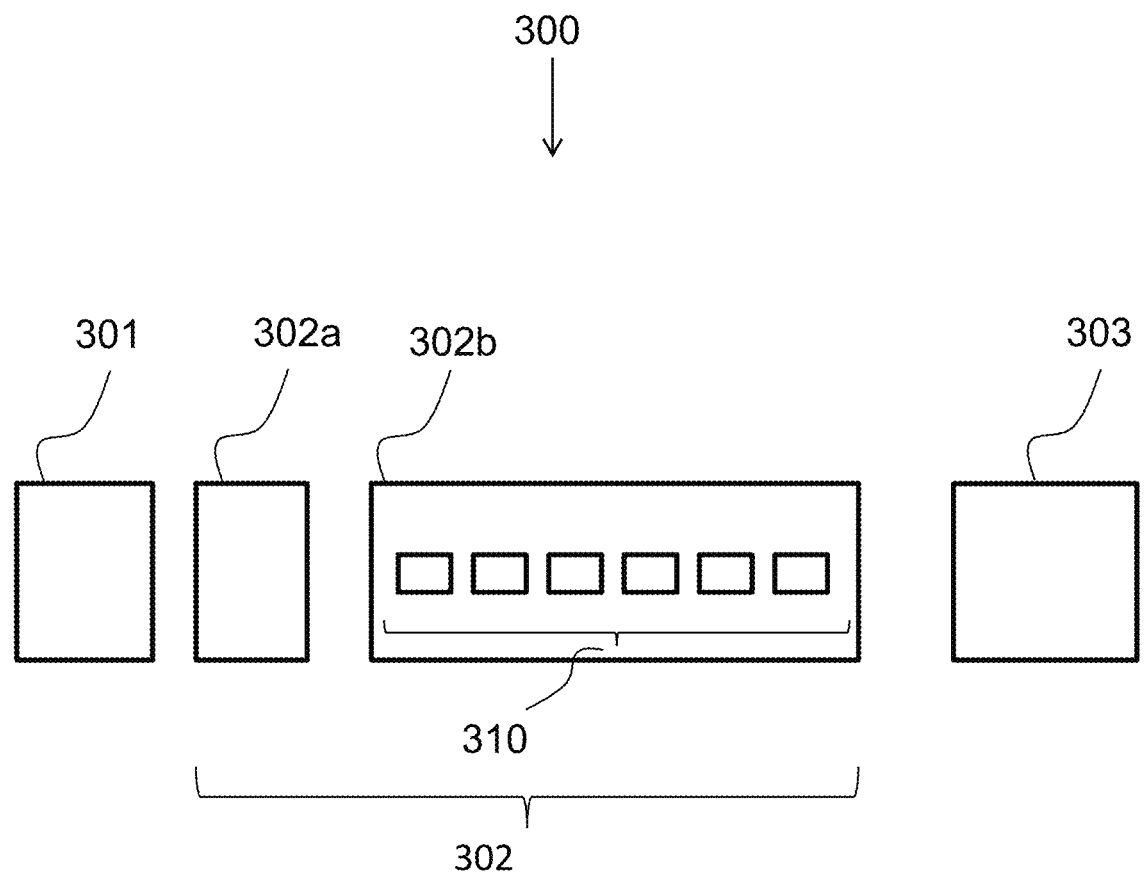
FIGS. 3a-f are schematic overviews illustrating exemplifying embodiments of an image-processing device and of video processing methods in the image-processing device.

FIG. 3a is a schematic view of an imaging system 300, in this case of a digital video camera. The imaging system images a scene on an image sensor 301. The image sensor 301 may be provided with a Bayer filter, such that different pixels will receive radiation of a particular wavelength region, in a known pattern. Typically, each pixel of the captured image is represented by one or more values representing the intensity of the captured light within a certain wavelength band. These values are usually referred to as colour components, or colour channels. The term "image" may refer to an image frame or video frame including information originating from an image sensor that has captured the image.

After having read the signal of individual sensor pixels of the image sensor 301, different image processing actions may be performed, such as demosaicing and color correction.

The resulting image is forwarded to an image-processing pipeline 302. In the image-processing pipeline 302, further processing is performed on the image. Such further processing may be noise filtering (for eliminating spatial and/or temporal noise), distortion correction (for eliminating effects of, e.g., barrel distortion), global and/or local tone mapping (e.g., enabling imaging of scenes containing a wide range of intensities), transformation (e.g., rotation), flat-field correction (e.g., for removal of the effects of vignetting), application of overlays (e.g., privacy masks, explanatory text), etc. The image-processing pipeline 302 may also be associated with an analytics engine performing object detection, recognition, alarms, etc.

The image-processing pipeline 302 may comprise an image processing part 302a and a video post-processing part 302b. The image processing part 302a may e.g. apply noise filtering, distortion correction, global and/or local tone mapping, transformation, and flat-field correction, as mentioned above. The video post-processing part 302b may for example perform image stabilization, crop parts of an image, apply overlays, and comprise the analytics engine.

Following the image-processing pipeline 302 the image may be forwarded to video encoder 303, sometimes referred to as just an encoder 303, wherein the information in the image frames is coded according to an encoding protocol in a known manner, such as H.264, and forwarded to for example a receiving client, exemplified here with the monitor 280, to the video server 260, to the storage 270, etc.

The video coding process produces a number of values that must be encoded to form a compressed bit stream. These values may include:
 quantized transform coefficients,
 information to enable the decoder to re-create the prediction,
 information about the structure of the compressed data and the compression tools used during encoding, and
 information about the complete video sequence.

These values and parameters (syntax elements) are converted into binary codes using for example variable length coding and/or arithmetic coding. Each of these encoding methods produces an efficient, compact binary representation of the information, also referred to as an encoded bit stream. The encoded bit stream can then be stored and/or transmitted.

Exemplifying methods for controlling video processing according to embodiments herein will now be described with reference to a flowchart of FIG. 4 and with further reference to FIG. 3a and FIGS. 3b-3f. The methods for controlling video processing may for example be implemented in any of the image processing devices of FIG. 2a or 2b. One or more of the following actions presented in FIG. 4 may be performed in the following exemplifying order. In other examples, the order may differ from what is described below.

Action 401

The image-processing device 210 receives a stream of images 310 emanating from the image sensor 301. For example, in FIG. 3a the stream of images 310 comprises six image frames. Timewise, the stream of images passes from the image sensor 301 through the image-processing pipeline 302 and further to the encoder 303. The oldest frame is the frame furthest to the right. This relation of the frames to the time will also hold for FIGS. 3b-3f.

As mentioned above, and as seen in FIG. 3a, the image-processing pipeline 302 may receive the stream of images 310 emanating from the image sensor 301. In the image-processing pipeline 302, further processing is performed on the image. In particular, such further processing that is relevant for embodiments herein may comprise application of privacy masks, e.g. on moving objects. The image-processing pipeline 302 may also be associated with an analytics engine performing object detection and recognition, in particular human/face detection, moving object detection and background identification.

Action 402

Figure 3B:
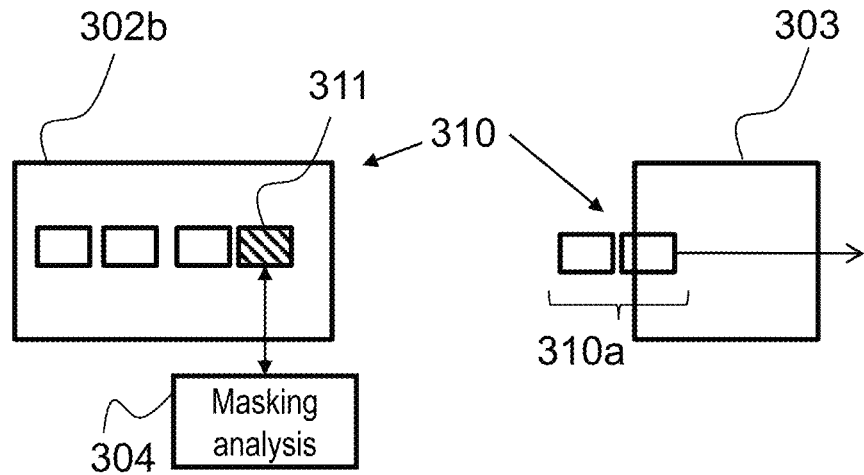
Figure 4:
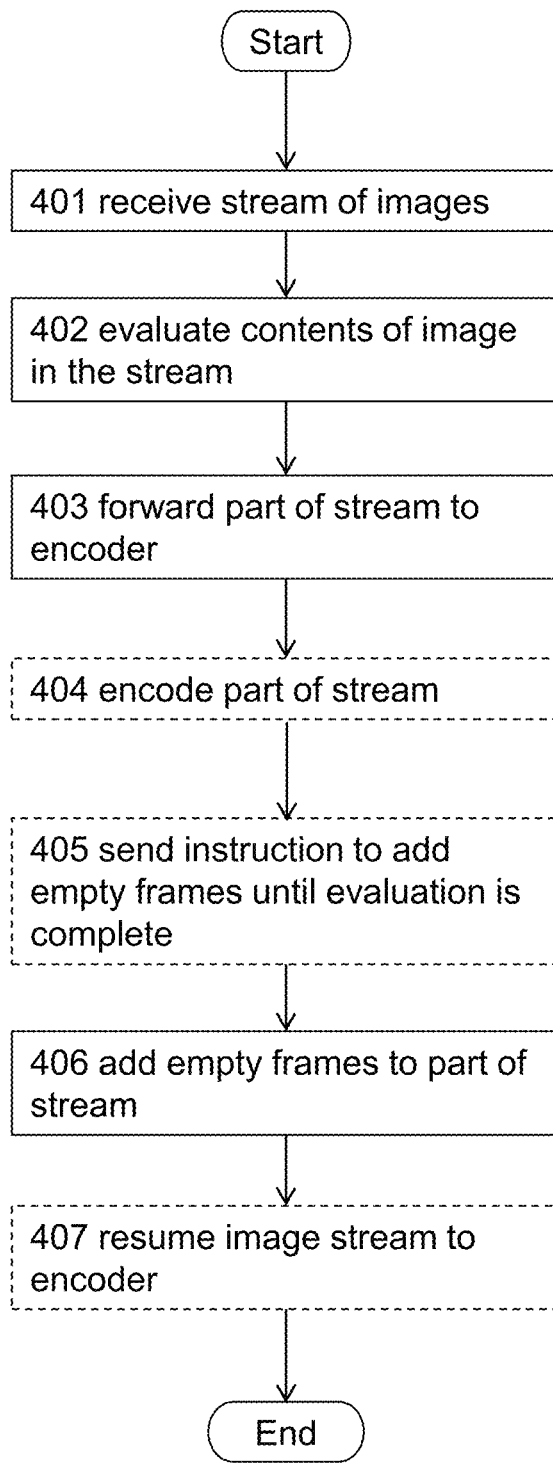
FIG. 4 is a flowchart illustrating embodiments of a video processing method in an image-processing device.

In FIG. 3b the image-processing device 210 evaluates the contents of an image 311 in the stream 310. The image 311 may also be referred to as the image frame 311, or the video frame 311, or just the frame 311. For example, the evaluation may comprise analysis related to the masking of or anonymizing the image frame 311 such as determining what should be shown or covered in the image 311. Such analysis and masking may for example be relevant for making sure that a video complies with the General Data Protection Regulation (GDPR) of the European Union. In FIG. 3b the evaluation is performed by an evaluating module 304. There may be multiple evaluating modules that each perform different evaluations on the evaluated image 311. These multiple evaluations may at least in part be performed in parallel.

As will be described below in action 405 the completion of the evaluation may be used to control insertion of empty frames into the stream of images 310, e.g. when to stop adding empty frames. In case of multiple evaluations of the image 311, the image-processing device 210 may control insertion of empty frames based on the completion of the last completed evaluation.

A synchronisation module of the image-processing device 210 may synchronize display of the image 311 with an evaluation process. For example, the synchronisation module may obtain information of when an evaluation of the image 311 is complete. Once the mask analysis of the image frame 311 has finished it may be regarded as a synchronized frame. A synchronized frame may mean that the mask and the image frame 311 are synchronized, e.g. by a timing relationship such as a timestamp.

Action 403

While the analysis of the image 311 is ongoing the image-processing device 210 forwards in chronological order a part 310a of the image stream 310 to the video encoder 303. The part 310a of the image stream 310 which is forwarded is antecedent the image 311 being evaluated. This is also illustrated in FIG. 3b. In FIG. 3b the part 310a of the image stream 310 that is forwarded comprises two image frames which are antecedent the image 311 being evaluated. Antecedent in this context means that these frames were captured at time instances before the image 311, which is being evaluated, was captured.

Action 404

When the encoder 303 receives the antecedent part 310a of the image stream 310 it starts to code the information in the image frames of the antecedent part 310a according to an encoding protocol, such as H.264. However, as the image 311 is being evaluated for a certain finite time the frame rate of the encoded images will drop if the evaluation takes longer than a certain time. For example, to achieve a 30 fps video out of the encoder 303 the encoder should receive a new frame every 33 ms.

As discussed above in the summary, the above problem may be solved by e.g. sending a copy of a most recent previously successfully synchronized video frame 331 to the encoder. However, this creates an undesirable extra system load which increases the power consumption of the image-processing device 210, since the same frames are processed again.

Figure 3C:
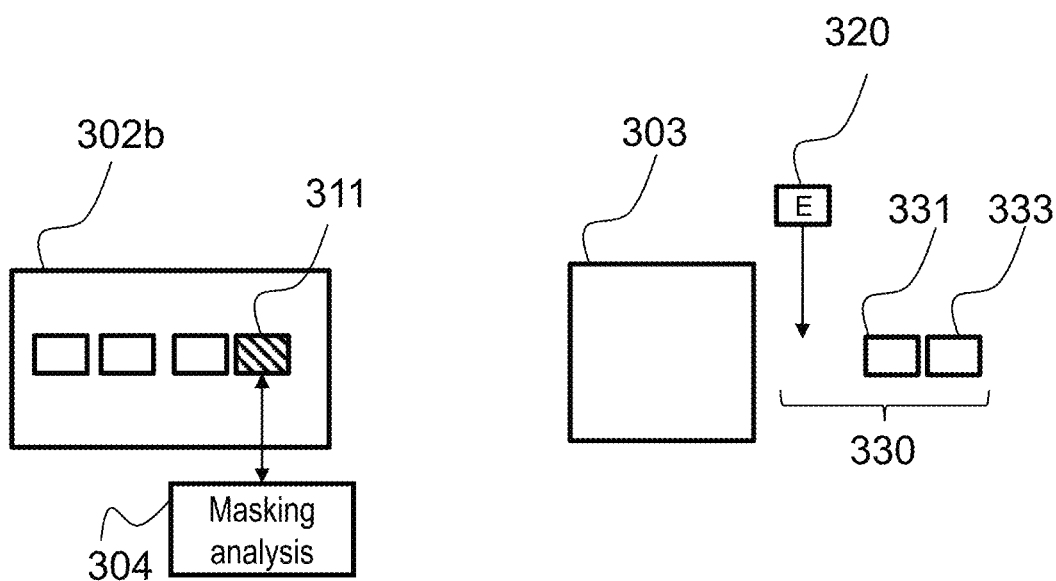
Figure 3D:
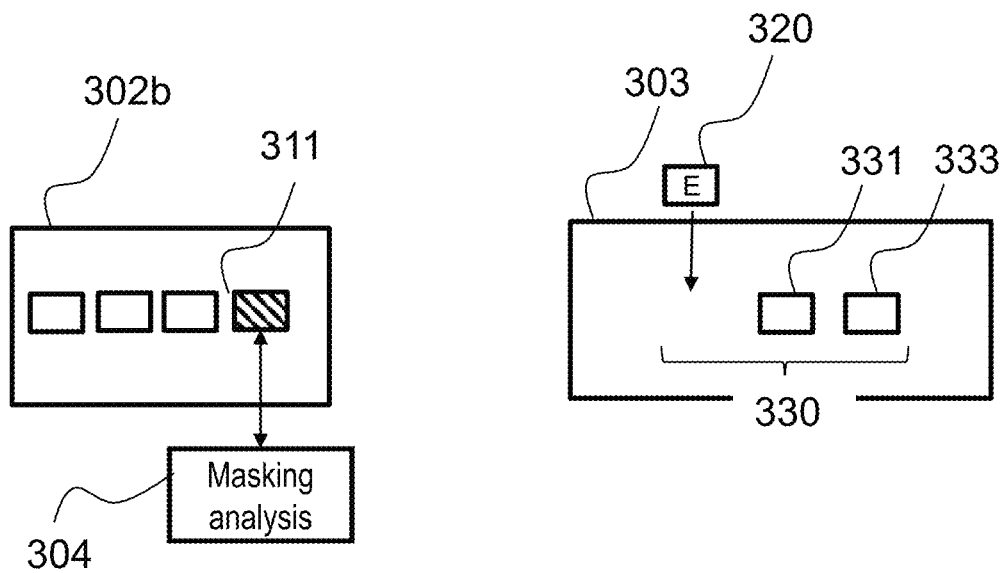
Figure 3E:
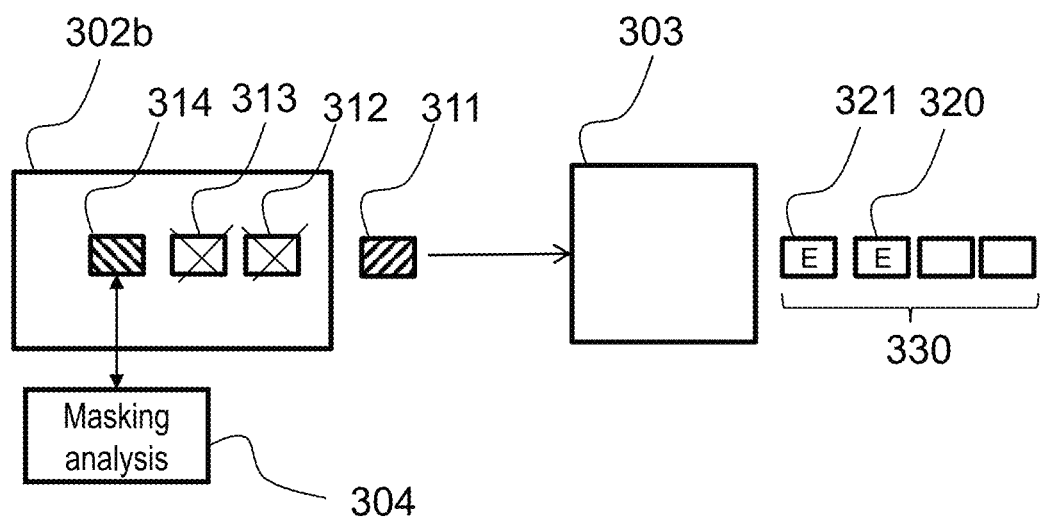

According to embodiments herein the above problems are solved by adding at least a first empty frame 320 at the end of an encoded image stream 330 corresponding to the forwarded image stream 310a, until the evaluation is complete. This is illustrated in FIGS. 3c-e.

By adding the at least first empty frame 320 at the end of the encoded image stream 330 the image-processing device 210 saves power since the added empty frames 320 require less image processing, in some cases even no further image processing. The reduction of the processing depends on where in the image-processing pipeline 302 the function that synchronizes the video frame with the mask resides. For example, it is possible to remove processing related to all or parts of the image-processing pipeline 302, e.g. the video post-processing part 302b, encoding as well as parts of the software handling of encoded frames for streaming, and whatever analytics application is run on the processed image. Since it is known that the frame is empty the analytics application does not need to be rerun.

This added frame 320 can be inserted and discarded without affecting the video quality, but will create a frame placeholder, e.g. for the imaging system 300, without using up performance of the image-processing device 210.

A further advantage of embodiments herein is that the bandwidth required for transmitting the encoded stream of images 330 is reduced compared to other methods of transmitting privacy-masked video. This is so because the amount of data needed to represent the empty frame 320 is considerably less than the amount of data needed to represent a frame originating from the image sensor, or a copy of such a frame.

Action 405

In order for the image-processing device 210 to know when to add the at least first empty frame 320 it may use signalling between different parts, such as between different software or hardware modules. For example, as mentioned above in relation to action 402, the synchronisation module may obtain information of when an evaluation of the image 311 is complete, and then send instructions about start and/or stop of adding empty frames 320, e.g. to the adding module or the encoder 303.

For example, in relation to FIG. 3b the synchronization module may obtain information from the evaluating module 304 indicating that the evaluation is complete. In case of multiple evaluations, e.g. performed by multiple evaluating modules 304, the image-processing device 210 may wait to send instructions about completion of the evaluation until all evaluations are complete. This is for example done in order to keep the synchronisation between the mask and the original image.

Therefore, in some embodiments the image-processing device 210 sends an instruction to add the at least first empty frame 320. The image-processing device 210 may for example instruct an adding module, or any other software or hardware module to add the at least first empty frame 320.

In some embodiments the image-processing device 210 instructs the video encoder 303 to add the at least first empty frame 320. FIG. 3d illustrates adding the empty image 320 by the encoder 303.

The instructions may be sent until the evaluation of the image frame 311 is complete. For example, the image-processing device 210 may send a first instruction to add the at least first empty frame 320, and then send a further second instruction to add a further second empty frame 321 when there is a need to add a new frame during the evaluation. In general, multiple empty frames may be added. FIG. 3e illustrates adding two empty frames: first empty frame 320 and the further empty frame 321.

In some other embodiments empty frames 320, 321 are added after an instruction to add the at least first empty frame 320 has been received, e.g. by the adding module or the encoder 303, and until a new instruction to stop adding empty frames is received. For example, both the first empty frame 320 and the further empty frame 321 may be added based on only one instruction. The timing of the addition of the empty frames may be pre-determined.

Sending only an initial instruction to start the adding of empty frames may be advantageous when many frames need to be added since the number of instructions will be less.

Action 406

As mentioned above, while the image 311 is being evaluated, e.g. until the evaluation is complete, the at least first empty frame 320 is added at the end of an encoded image stream 330 corresponding to the forwarded image stream 310a. How to detect and signal completion of the evaluation was discussed above in the description of actions 402 and 405.

In some embodiments the rate at which the at least first empty frame 320 is added at the end of the encoded image stream 330 follows a predetermined current image frame rate, such that the frame rate of the encoded image stream 330 is constant. In other words, the rate at which the empty frames 320 are injected into the encoded stream 330 may follow a set current image frame rate of the video, such that the rate at which images are leaving the encoder 303 is constant. As mentioned above, preserving a certain desired frame rate may be beneficial for internal processes of the image-processing device 210 as well as for a receiver of the generated video stream.

In some embodiments the previous frame is a latest encoded frame 331, or in other words an immediately previous frame 331, while in other embodiments the previous frame is any previous frame, e.g. a frame 333 before the immediately previous frame.

The empty frame 320 may be a frame with no encoded difference in relation to a previous frame 331, 333 of the encoded image stream 330. In some embodiments the empty frame 320 may be a pre-computed encoded frame. With a pre-computed encoded frame is meant that instead of producing an encoded frame with the encoder 303, the encoded frame is produced in advance by a software algorithm, e.g. by encoding every empty frame 320 in the same way. Thus, the empty frame 320 may be a pre-computed encoded frame with no encoded difference in relation to the previous frame 331, 333 of the encoded image stream 330. For example, such a pre-computed empty frame 320 may comprise one or more macroblocks indicating that there has been no change in relation to the previous frame 331, 333. Such change may for example relate to the image content of the previous frame 331, 333, such as the pixel values.

In a further example such a pre-computed empty frame 320 may comprise macroblocks, of which only a single macroblock, such as the last macroblock, comprises information indicating that there has been no change in relation to the previous frame 331, 333.

In some other embodiments the empty frame 320 may comprise information indicating a fixed motion in relation to the previous frame. Such information may be based on a calculated motion information, e.g. a calculated motion vector from a gyroscope.

In some embodiments the empty frame 320 does not comprise prediction information which have been motion-compensated. In general, prediction information may be motion-compensated. The motion-compensated prediction information may comprise coded motion vectors and the prediction errors. Instead, in embodiments herein the prediction information may indicate that there has been no motion. This is enough information to re-create the prediction. Such prediction information may for a normal frame be comprised in an encoded processing unit, such as an encoded macroblock. Thus, in some embodiments the empty frame 320 does not comprise an encoded macroblock: For example, in some embodiments the macroblocks of the empty frame have not been encoded by the encoder 303. Instead, the macroblock may have been pre-computed as explained above.

Further, in some embodiments the empty frame 320 does not comprise encoded coefficients. Each encoded coefficient may be a weighting value for a standard basis pattern. When combined in a decoder, the weighted basis patterns re-create a block, such as a macroblock, of residual samples.

Instead the empty frame may comprise a flag indicating that no macroblocks were encoded. For example, the flag may be implemented as a meta-data flag in the transport or container format, or as part of the codec meta-data. Another implementation of the flag may be to use the Quantization Parameter (QP). Since the QP-value is not needed for decoding the empty frame 320, the QP-value may be used as an identifier of the empty frame 320, or in other words as an empty frame marker. The identifier of the empty frame 320 may thus correspond to the flag indicating that no macroblocks were encoded. The empty frame can easily be identified by the identifier and if necessary removed or discarded by another application. Thus, at the client side the flag provides a direct and low-cost means for indicating the empty frame 320. With such a solution the client does not need to analyse the frames in order to find the empty frame 320. For example, the normal QP value per slice, or base QP per frame, in the Slice Header according to the H.264/H.265 standard may be set to QP 51. For empty frames, e.g. frames without encoded block residuals, the QP is not used by the decoder, and if QP 51 is never used by the encoder 303 it can be used as a "flag" to indicate the empty frame. An advantage of using the QP-value is that there is no need for any extra handling of it since it is already a part of the video ready to be used.

In some embodiments video processing is not performed on the empty frame 320. That is, no video processing is performed after the evaluation is complete.

In some embodiments the at least first empty frame 320 at the end of the encoded image stream 330 is added after the encoder 303, such that the empty frame 320 does not pass through the encoder 303. FIG. 3c and FIG. 3e both illustrate adding the empty frame after the encoder 303. FIG. 3c illustrates adding one empty frame 320 after the encoder 303, while FIG. 3e illustrates adding two empty frames 320, 321 after the encoder 303. An advantage of adding empty frames 320 after the encoder is that the power consumption can be reduced compared to a method where added frames need to be encoded. A combination of adding multiple empty frames 320, 321 within and after the encoder 303 is also possible. For example, a first empty frame 320 may be added by the encoder 303, while a second empty frame 321 may be added after the encoder, and vice versa.

Action 407

Once the evaluation of the image 311 is completed the image-processing device 210 resumes to forward the stream of images 310 to the video encoder 303. The resuming comprises forwarding the evaluated image 311 to the video encoder 303.

Figure 3F:
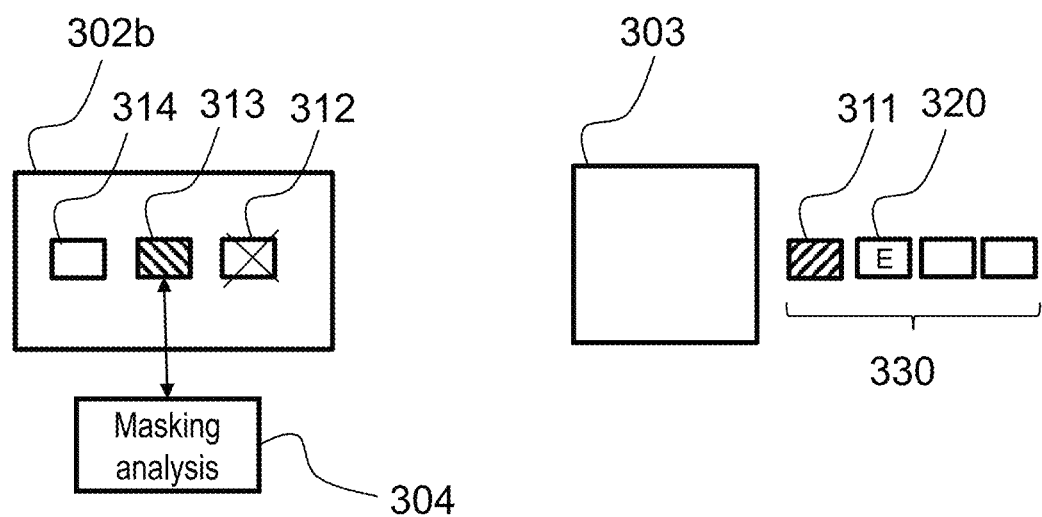

FIG. 3e illustrate forwarding of the evaluated image 311 to the encoder 303. In FIG. 3f the image 311 has passed through the encoder 303, and has been added to the encoded stream of images including the empty frame 320. FIG. 3e and FIG. 3f further illustrate how the evaluation of further images may continue. In both FIGS. 3e and 3f the empty frames 320, 321 have already been added during evaluation of image 311.

In FIG. 3e and FIG. 3f a buffer for the masking analysis comprises three buffer image frames: a first buffer image frame 312, a second buffer image frame 313 and a third buffer image frame 314. In order to compensate for the added empty frames 320, 321 a next image for evaluation may be an image after a following image, which is next in order after the evaluated image 311. In fact, the next image for evaluation 313 may depend on the number of empty frames 320, 321 added between the evaluated image 311 and the frame just before the evaluated image frame 311. In the case illustrated in FIG. 3f one empty frame is added and thus the image-processing device 210 skips one image frame when it selects the next image for evaluation, which is the second buffer image frame 313. The skipping is indicated by crossed-over image frames, such as the following first buffer image frame 312 in FIG. 3f. If on the other hand two frames 320, 321 were added, as in FIG. 3e, two image frames of the buffer, such as the first and second buffer image frames 312, 313 may be skipped when selecting the next image frame for analysis, such as the third buffer image frame 314. When the next image will be evaluated, new empty frames are added in the same way as explained above.

In some embodiments, the next image for evaluation 313 is chosen by skipping a number of frames that correspond to the number of added frames. The skipped frames may be dropped and not sent to the encoder.

A corresponding procedure is also possible when multiple image frames are being evaluated in parallel or at least partly in parallel.

Since the next image for evaluation depends on the number of empty frames added, a timing of the original stream of images 310 can be maintained and thus the video will preserve its frame rate, and not be affected. However, the effective rate of updating the images will be lowered in this way.

Figure 5:
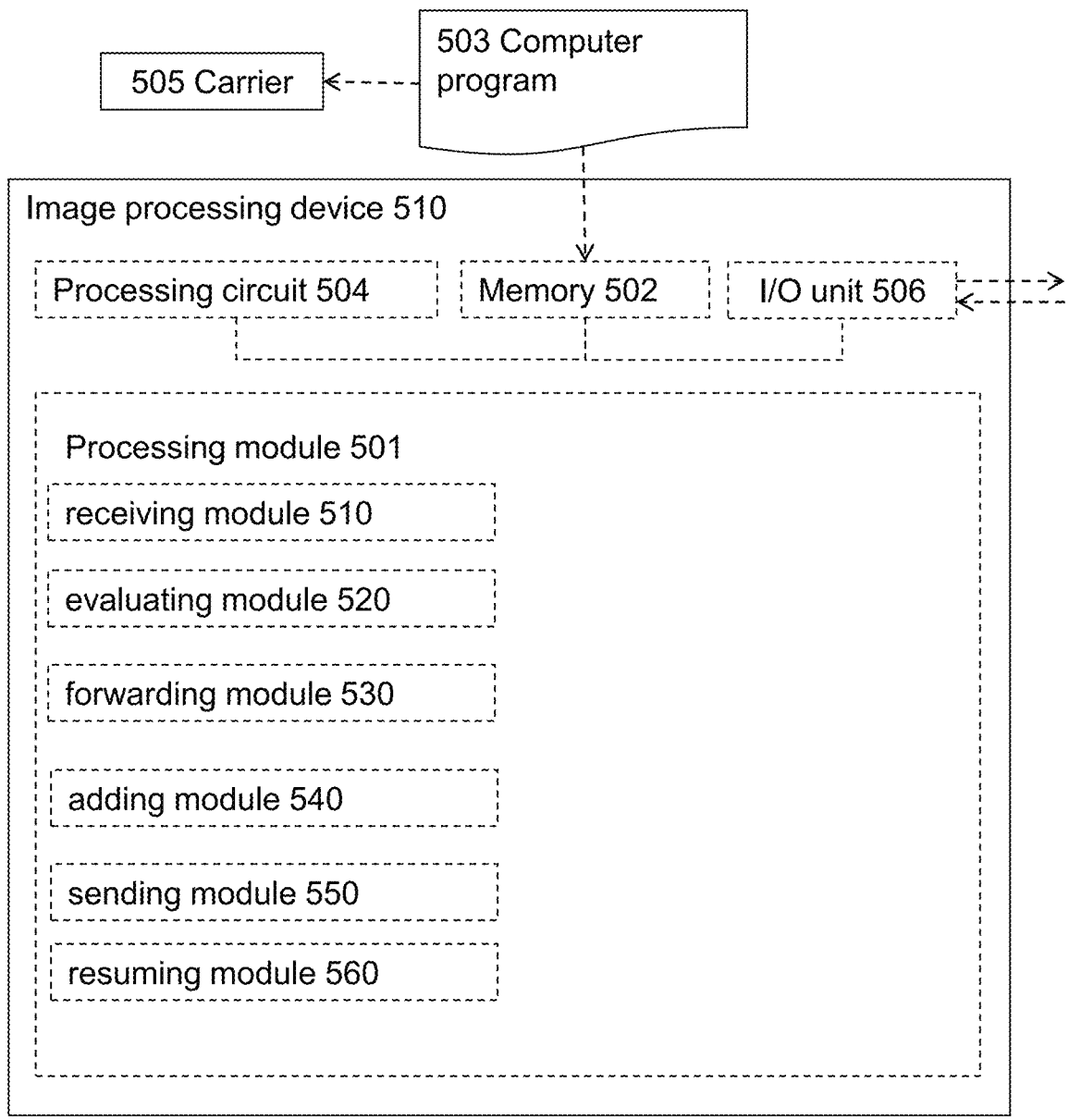
FIG. 5 is a block diagram illustrating embodiments of the image-processing device.

With reference to FIG. 5, a schematic block diagram of embodiments of an image-processing device 510 corresponding to the different image-processing devices of FIGS. 2a and 2b is shown. The image-processing device 510 is configured for video processing.

The image-processing device 510 may comprise a processing module 501, such as a means for performing the methods described herein. The means may be embodied in the form of one or more hardware modules and/or one or more software modules The image-processing device 510 may further comprise a memory 502. The memory may comprise, such as contain or store, instructions, e.g. in the form of a computer program 503, which may comprise computer readable code units which when executed on the image-processing device 510 causes the image-processing device 510 to perform the method of video processing.

According to some embodiments herein, the image-processing device 510 and/or the processing module 501 comprises a processing circuit 504 as an exemplifying hardware module, which may comprise one or more processors. Accordingly, the processing module 501 may be embodied in the form of, or 'realized by', the processing circuit 504. The instructions may be executable by the processing circuit 504, whereby the image-processing device 510 is operative to perform the methods of FIG. 4. As another example, the instructions, when executed by the image-processing device 510 and/or the processing circuit 504, may cause the image-processing device 510 to perform the methods according to FIG. 4.

In view of the above, in one example, there is provided an image-processing device 510 for video processing. Again, the memory 502 contains the instructions executable by said processing circuit 504 whereby the image-processing device 510 is operative for performing the method according to FIG. 4:

receiving the stream of images 310 emanating from an image sensor 301,
evaluating the contents of an image 311 in the stream 310,
forwarding in chronological order the part 310a of the image stream 310, which part 310a is antecedent the image 311 being evaluated, to the video encoder 303, and
until the evaluation is complete, adding the at least first empty frame 320 at the end of an encoded image stream 330 corresponding to the forwarded image stream 310a.

FIG. 5 further illustrates a carrier 505, or program carrier, which comprises the computer program 503 as described directly above. The carrier 505 may be one of an electronic signal, an optical signal, a radio signal and a computer readable medium.

The image-processing device 510 may further be operative to perform the methods according to the detailed embodiments described above in connection to FIG. 4.

Moreover, the processing module 501 comprises an Input/Output unit 506. According to an embodiment, the Input/Output unit 506 may comprise the image sensor 301 configured for capturing the image 200.

In some embodiments, the image-processing device 510 and/or the processing module 501 may comprise one or more of receiving module 510, an evaluating module 520, a forwarding module 530, an adding module 540, a sending module 550, a resuming module 560, as exemplifying hardware modules. In other examples, one or more of the aforementioned exemplifying hardware modules may be implemented as one or more software modules.

Accordingly, the image-processing device 510 is configured for video processing.

Therefore, according to the various embodiments described above, the image-processing device 510 and/or the processing module 501 and/or the receiving module 510 is configured for receiving the stream of images 310 emanating from the image sensor 301.

The image-processing device 510 and/or the processing module 501 and/or the evaluating module 520 is configured for evaluating the contents of the image 311 in the stream 310.

The image-processing device 510 and/or the processing module 501 and/or the forwarding module 530 may be configured for forwarding in chronological order the part 310a of the image stream 310 that is antecedent the image 311 being evaluated, to the video encoder 303.

The image-processing device 510 and/or the processing module 501 and/or the projection module 540 may be configured for adding the at least first empty frame 320 at the end of the encoded image stream 330 corresponding to the forwarded image stream 310a, until the evaluation is complete.

In some embodiments video processing is not performed on the at least first empty frames 320.

The image-processing device 510 and/or the processing module 501 and/or the sending module 550 may be configured for sending an instruction to add the at least first empty frame 320, until the evaluation is complete.

The image-processing device 510 and/or the processing module 501 and/or the resuming module 560 may be configured for resuming to forward the stream of images 310 to the video encoder 303. The resuming comprises forwarding the evaluated image 311 to the video encoder 303.

As used herein, the term "module" may refer to one or more functional modules, each of which may be implemented as one or more hardware modules and/or one or more software modules and/or a combined software/hardware module. In some examples, the module may represent a functional unit realized as software and/or hardware.

As used herein, the term "computer program carrier", "program carrier", or "carrier", may refer to one of an electronic signal, an optical signal, a radio signal, and a computer readable medium. In some examples, the computer program carrier may exclude transitory, propagating signals, such as the electronic, optical and/or radio signal. Thus, in these examples, the computer program carrier may be a non-transitory carrier, such as a non-transitory computer readable medium.

As used herein, the term "processing module" may include one or more hardware modules, one or more software modules or a combination thereof. Any such module, be it a hardware, software or a combined hardware-software module, may be a receiving means, evaluating means, forwarding means, adding means, sending means, resuming means or the like as disclosed herein. As an example, the expression "means" may be a module corresponding to the modules listed above in conjunction with the figures.

As used herein, the term "software module" may refer to a software application, a Dynamic Link Library (DLL), a software component, a software object, an object according to Component Object Model (COM), a software component, a software function, a software engine, an executable binary software file or the like.

The terms "processing module" or "processing circuit" may herein encompass a processing unit, comprising e.g. one or more processors, an Application Specific integrated Circuit (ASIC), a Field-Programmable Gate Array (FPGA) or the like. The processing circuit or the like may comprise one or more processor kernels.

As used herein, the expression "configured to/for" may mean that a processing circuit is configured to, such as adapted to or operative to, by means of software configuration and/or hardware configuration, perform one or more of the actions described herein.

As used herein, the term "action" may refer to an action, a step, an operation, a response, a reaction, an activity or the like. It shall be noted that an action herein may be split into two or more sub-actions as applicable. Moreover, also as applicable, it shall be noted that two or more of the actions described herein may be merged into a single action.

As used herein, the term "memory" may refer to a hard disk, a magnetic storage medium, a portable computer diskette or disc, flash memory, Random Access Memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a MemoryStick, a Multimedia Card (MMC), Secure Digital (SD) card, etc. One or more of the aforementioned examples of computer readable medium may be provided as one or more computer program products.

As used herein, the term "computer readable code units" may be text of a computer program, parts of or an entire binary file representing a computer program in a compiled format or anything there between.

As used herein, the terms "number" and/or "value" may be any kind of number, such as binary, real, imaginary or rational number or the like. Moreover, "number" and/or "value" may be one or more characters, such as a letter or a string of letters. "Number" and/or "value" may also be represented by a string of bits, i.e. zeros and/or ones.

As used herein, the expression "in some embodiments" has been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

The invention claimed is:

1. A method for controlling video processing, wherein the method comprises:
   receiving a stream of images emanating from an image sensor,
   evaluating the contents of an image in the stream, wherein evaluating the contents of the image in the stream comprises analyzing related to masking of or anonymizing the image frame,
   forwarding in chronological order a part of the image stream, which part is antecedent the image being evaluated, to a video encoder, and
   until the evaluating is complete, adding at least a first empty frame at the end of an encoded image stream corresponding to the forwarded image stream, wherein the first empty frame is a frame with no encoded difference in relation to a previous frame of the encoded image stream.

2. The method according to claim 1, wherein the rate at which the one or more empty frames are added at the end of the encoded image stream follows a predetermined current image frame rate, such that the frame rate of the encoded image stream is constant.

3. The method according to claim 1, wherein the at least first empty frame is a pre-computed encoded frame with no encoded difference in relation to a previous frame, of the encoded image stream.

4. The method according to claim 3, wherein the previous frame is a latest encoded frame.

5. The method according to claim 1, wherein the at least first empty frame does not comprise an encoded macroblock.

6. The method according to claim 1, wherein the at least first empty frame comprises a flag indicating that no macroblocks were encoded.

7. The method according to claim 1, wherein video processing is not performed on the at least first empty frames.

8. The method according to claim 1, wherein adding the at least first empty frame at the end of the encoded image stream is performed after the encoder, such that the at least first empty frame does not pass through the encoder.

9. The method according to claim 1, wherein the method further comprises, until the evaluating is complete, sending an instruction to add the at least first empty frame.

10. The method according to claim 1, wherein the method further comprises, resuming to forward the stream of images to the video encoder, wherein the resuming comprises forwarding the evaluated image to the video encoder.

11. An image-processing device having circuitry configured to perform the method according to claim 1.

12. A non-transitory computer storage device including a computer program, comprising computer readable code units which when executed on an image-processing device causes the image-processing device to perform the method according to claim 1.

13. The non-transitory computer storage device according to claim 12, wherein the at least first empty frame is a pre-computed encoded frame with no encoded difference in relation to a previous frame of the encoded image stream.

14. The non-transitory computer storage device according to claim 12, wherein the at least first empty frame does not comprise an encoded macroblock.

15. The non-transitory computer storage device according to claim 12, wherein the at least first empty frame comprises a flag indicating that no macroblocks were encoded.

16. The non-transitory computer storage device according to claim 12, wherein video processing is not performed on the at least first empty frames.

17. The non-transitory computer storage device according to claim 12, wherein adding the at least first empty frame at the end of the encoded image stream is performed after the encoder, such that the at least first empty frame does not pass through the encoder.

18. The non-transitory computer storage device according to claim 12, wherein the method further comprises, until the evaluating is complete, sending an instruction to add the at least first empty frame.

19. The non-transitory computer storage device according to claim 12, wherein the method further comprises, resuming to forward the stream of images to the video encoder, wherein the resuming comprises forwarding the evaluated image to the video encoder.

* * * * *